(12) United States Patent
Wang et al.

(10) Patent No.: US 9,544,820 B2
(45) Date of Patent: Jan. 10, 2017

(54) METHOD AND APPARATUS FOR USER RELOCATION IN A RADIO NETWORK

(71) Applicant: Samsung Electronics Co., Ltd., Gyeonggi-do (KR)

(72) Inventors: Boling Wang, Beijing (CN); Hongsheng Jia, Beijing (CN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/849,196

(22) Filed: Sep. 9, 2015

(65) Prior Publication Data

US 2015/0382246 A1  Dec. 31, 2015

Related U.S. Application Data

(63) Continuation of application No. 13/062,252, filed as application No. PCT/KR2009/005035 on Sep. 7, 2009.

(30) Foreign Application Priority Data

Sep. 9, 2008  (CN) .......................... 2008 1 0211903

(51) Int. Cl.
  *H04W 36/00*  (2009.01)
  *H04W 36/38*  (2009.01)
  *H04W 36/10*  (2009.01)
  *H04W 84/10*  (2009.01)

(52) U.S. Cl.
  CPC ..... *H04W 36/0016* (2013.01); *H04W 36/0033* (2013.01); *H04W 36/38* (2013.01); *H04W 36/10* (2013.01); *H04W 84/105* (2013.01)

(58) Field of Classification Search
  None
  See application file for complete search history.

(56) References Cited

U.S. PATENT DOCUMENTS

| | | | |
|---|---|---|---|
| 6,628,631 B1 | 9/2003 | Mazawa et al. | |
| 2002/0137515 A1 | 9/2002 | Igarashi et al. | |
| 2006/0072506 A1* | 4/2006 | Sayeedi ................ | H04W 36/12 370/331 |
| 2006/0099949 A1 | 5/2006 | Jung et al. | |
| 2006/0146803 A1* | 7/2006 | Bae ..................... | H04L 63/0869 370/352 |
| 2006/0245365 A1 | 11/2006 | Monk et al. | |

(Continued)

OTHER PUBLICATIONS

3GPP TS 23.003 v3.14.0 3rd Generation Partnership Project; Technical Specification Group Core Network; Numbering, addressing and identification (Release 1999).*

(Continued)

*Primary Examiner* — Andrew Lai
*Assistant Examiner* — Jamaal Henson
(74) *Attorney, Agent, or Firm* — The Farrell Law Firm, P.C.

(57) ABSTRACT

An apparatus and method are provided for relocation in a Radio Network (RN). The method includes receiving, by a first node, from a second node, a Relocation Request message including information related to an identify of a User Equipment (UE); transmitting, from the first node, to the second node, a Relocation Response message in response to the Relocation Request message; receiving, by the first node, from the UE, a Physical Channel Reconfiguration complete message; and transmitting, from the first node, to the second node, a Relocation complete message.

16 Claims, 5 Drawing Sheets

(56) References Cited

U.S. PATENT DOCUMENTS

| | | | |
|---|---|---|---|
| 2007/0005803 A1 | 1/2007 | Saifullah et al. | |
| 2007/0213060 A1* | 9/2007 | Shaheen | H04W 36/10 455/436 |
| 2008/0039086 A1 | 2/2008 | Gallagher et al. | |
| 2008/0076425 A1* | 3/2008 | Khetawat | H04W 88/12 455/436 |
| 2009/0061877 A1* | 3/2009 | Gallagher | H04W 76/022 455/436 |
| 2009/0253430 A1 | 10/2009 | Asanuma et al. | |
| 2009/0253434 A1 | 10/2009 | Hayashi et al. | |
| 2009/0265543 A1* | 10/2009 | Khetawat | H04W 12/08 713/151 |
| 2009/0274118 A1 | 11/2009 | De Sanctis et al. | |
| 2009/0318144 A1 | 12/2009 | Thomas et al. | |
| 2010/0041405 A1* | 2/2010 | Gallagher | H04W 8/02 455/436 |
| 2010/0197311 A1 | 8/2010 | Walldeen et al. | |
| 2011/0222514 A1 | 9/2011 | Couaillet et al. | |
| 2011/0286429 A1 | 11/2011 | Vikberg et al. | |

OTHER PUBLICATIONS

3GPP TS 23.003 v3.14.0 3rd Generation Partnership Project; Technical Specification Group Core Netwrok; Numbering, addressing and identification (Rel. 1999).*

"UTRAN architecture for 3G Home Node B (HNB) Stage 2 (Release 9)", 3GPP 3rd Generation Partnership Project, 3GPP TS 25.467 (Dec. 2009).

Huawei, "RANAP Procedures on Iuh", R3-082030, 3GPP TSG RAN WG3 Meeting #61, Aug. 18-22, 2008.

3rd Generation Partnership Project; Technical Specification Group Radio Access Network; Home (e) NodeS; Network Aspects (Release 8), 3GPP TR R3.020 VO.B.O, Jun. 2008.

PCT/ISA/237 Written Opinion issued on PCT/KR2009/005035, Apr. 14, 2010, 3 pp.

PCT/ISA/210 Search Report issued on PCT/KR2009/005035, Apr. 14, 2010, 4 pp.

* cited by examiner

METHOD AND APPARATUS FOR USER RELOCATION IN A RADIO NETWORK

PRIORITY

This application is a Continuation application of U.S. patent application Ser. No. 13/062,252, which was filed in the U.S. Patent and Trademark Office on Mar. 4, 2011, as a National Phase Entry of PCT International Application No. PCT/KR2009/005035, and claims priority to Chinese Patent Application No. 200810211903.9, which was filed in the State Intellectual Property Office on Sep. 9, 2008, the entire content of each of which is incorporated herein by reference.

BACKGROUND OF THE INVENTION

1. Field of the Invention

The present invention relates to mobile communication and particularly to relocation of user equipment (UE) in Home NodeB (HNB) communication system.

2. Description of the Related Art

Conventionally, relocation is triggered by a UE measurement report. A radio network controller (RNC) determines whether or not to perform a handover or relocation based on analysis of the UE measurement report.

In a HNB system, the analysis of the UE measurement report is handled by the HNB. In a typical relocation procedure which is generally referred to as Outband Handover, a UE is relocated from a HNB to a macro NodeB.

In today's HNB system, application scenarios in which a user is relocated increase due to the increase in Home NodeB Gateway (HGW) and lu-h interface. In addition to the conventional relocation triggered by a UE measurement report, there is a need for a relocation which is triggered by a HGW and performed in cooperation with the HNB. For example:

1) When the HGW is reset, it is necessary to inform the HNB to reselect another HGW and relocate an existing user to a macro NodeB or another HNB which is capable of accept the user.

2) When the HGW detects a severe degradation on uplink service quality in the lu-h interface, it is necessary to improve the existing process to trigger the HNB to initiate a relocation process for the call of the user.

3) When a user who is currently being serviced is removed from the access control list by the administrator, the user can be relocated to a macro NodeB.

Therefore, in the existing lu-h or lu interface, there is no user relocation procedure initiated by an upper layer node.

SUMMARY OF THE INVENTION

Accordingly, the present invention is designed to address at least the problems and/or disadvantages described above and to provide at least the advantages described below.

An aspect of the present invention is to provide a user relocation procedure triggered by a HGW in a HNB system capable of satisfying new demands of new HNB scenarios.

In accordance with an aspect of the present invention, a method for relocation in a Radio Network (RN) is provided. The method includes receiving, by a first node, from a second node, a Relocation Request message including information related to an identify of a User Equipment (UE); transmitting, from the first node, to the second node, a Relocation Response message in response to the Relocation Request message; receiving, by the first node, from the UE, a Physical Channel Reconfiguration complete message; and transmitting, from the first node, to the second node, a Relocation complete message.

In accordance with another aspect of the present invention, a first node of a Radio Network (RN) is provided. The first node includes a transceiver; and a controller configured for receiving, from a second node, via the transceiver, a Relocation Request message including information related to an identity of a User Equipment (UE), transmitting, to the second node, via the transceiver, a Relocation Response message in response to the Relocation Request message, receiving, from the UE, via the transceiver, a Physical Channel Reconfiguration complete message, and transmitting, to the second node, via the transceiver, a Relocation complete message.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The detailed procedure of a HGW-initiated user relocation in which a UE is relocated from a HNB to a macro NodeB is provided according to the present invention.

Figure 1:
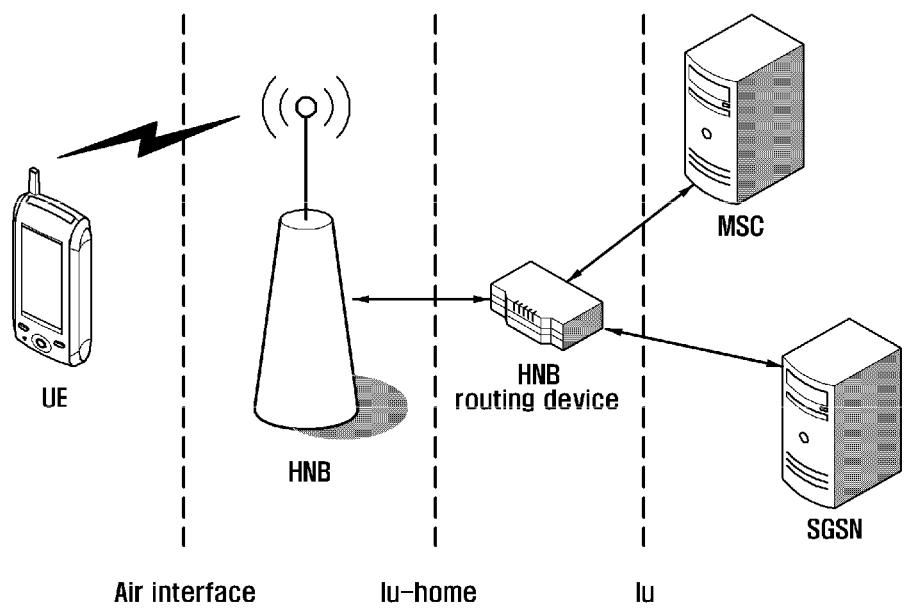
FIG. 1 illustrates a structure of a HNB system.

As illustrated in FIG. 1, a UE accesses a signaling system No. 7 network via a home-located HNB. Based on signaling bear functionality provided by the HNB and a HGW, the UE performs signaling interaction with a core network node, Serving GPRS Supporting Node (SGSN)/Mobile Switching Center (MSC), to control the communication with external devices.

The TS25.331 protocol and a conventional air interface (UU Interface) are adopted between the UE and the HNB. A lu-home interface is adopted between the HNB and the HGW. So far, the control protocol for the lu-home (which is referred to as lu-h) interface is still under development. The signaling interaction and transfer between the UE and the core network is conducted between the HGW and the MSC/SGSN using the conventional lu interface based on the TS25.413 protocol.

According to the present invention, a method of UE relocation triggered by the HGW is provided. This method satisfies the mobility requirements in such cases where the HGW is reset, the service quality in the lu-h interface is degraded, and the user is removed from the access control list (ACL) by the administrator. Thus, it is ensured that the user can continue to be serviced by the operator without interruption in such cases.

According to the present invention, a user relocation request/response message is added in the lu-h interface. The HGW transmits the relocation request message to each HNBs. The HNB initiates a typical relocation process according to the contents of the relocation request. After completion of the relocation process, the HNB transmits a relocation response message to the HGW. The contents of the relocation request message are shown in Table 1.

TABLE 1

| Contents of user relocation request message | |
|---|---|
| Level 1 member | Level 2 member |
| Transaction ID | |
| Number of Relocation User | |
| Relocation User Information List | >User Call ID |
| | >IMSI |
| | >Relocation Cause |

In Table 1, Transaction ID, which is the ID of each transaction, is used to prevent from processing same relocation request repeatedly. Number of Relocation User is the number of users to be relocated indicated in the message. Relocation User Information List indicates the information on individual users to be relocated. User Call ID is used to uniquely identify the user in the HNB. IMSI is the International Mobile Subscriber Identity of the user. Relocation Cause indicates the cause of relocation which includes three possibilities as shown in Table 2.

TABLE 2

| User relocation cause |
| Relocation Cause |
|---|
| Home NodeB Gateway Reset |
| Degradation of Service Quality of uplink direction in lu-h interface |
| Removed from ACL |

The contents of the user relocation response message are shown in Table 3.

TABLE 3

| Contents of user relocation response message | |
|---|---|
| Level 1 member | Level 2 member |
| Transaction ID | |
| Number of Relocation User | |
| Relocation Result List | >User Call ID |
| | >Relocation Result |
| | >Fail Cause |

In Table 3, Transaction ID corresponds to that in the relocation request message. Number of Relocation User is the number of users to be relocated indicated in the message. Relocation Result List indicates the result information on individual relocated users. User Call ID is use to uniquely identify the user in the HNB. Relocation Result indicates the result of relocation, with 0 indicating a success and 1 indicating a failure. If the relocation fails, the cause of the failure will be indicated in Fail Cause.

TABLE 4

| Cause of user relocation failure |
| Fail Cause |
|---|
| Home NodeB Internal Error |
| No Marco |
| Service Not Existing |

The First Embodiment

Figure 2:
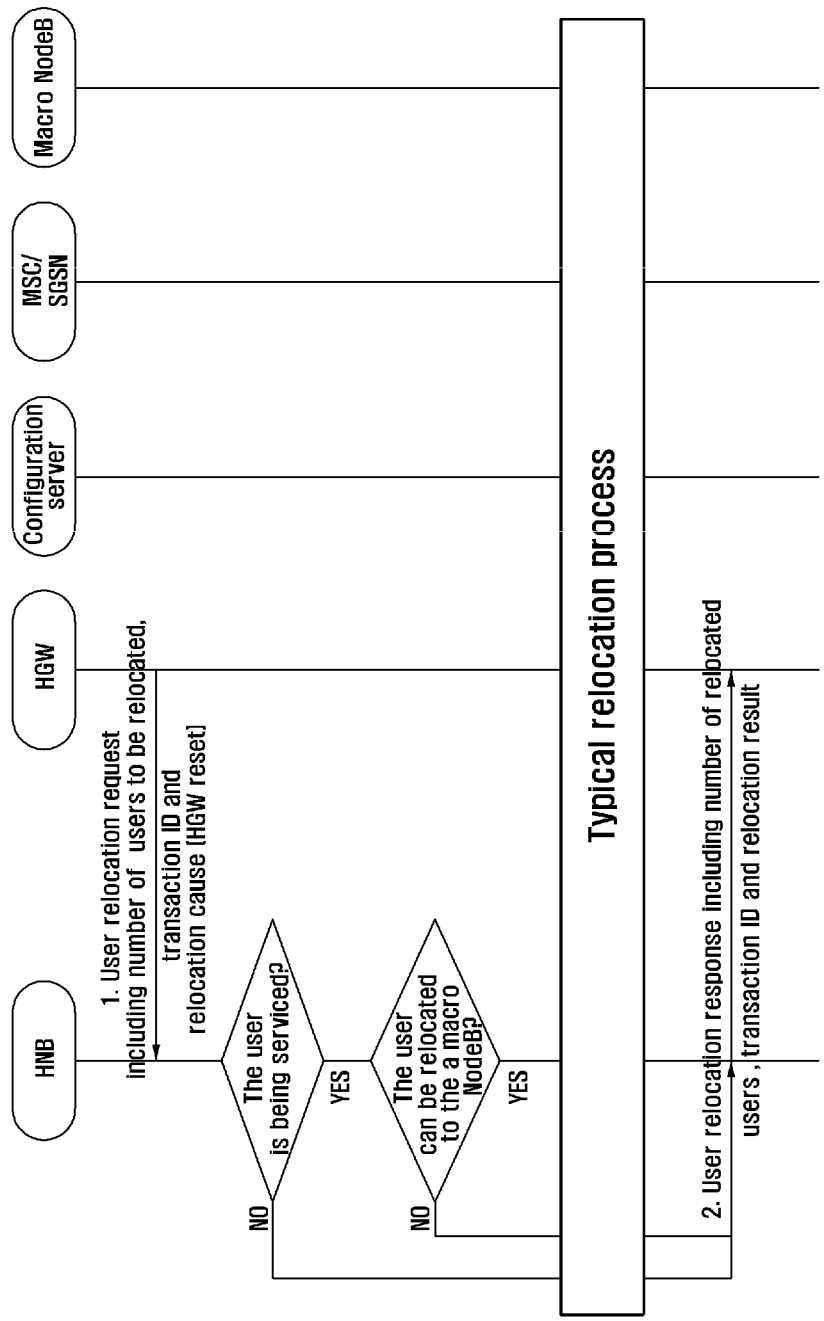
FIG. 2 illustrates a user relocation triggered by reset of a HGW.

A user relocation procedure triggered by the reset of the HGW is illustrated in FIG. 2.

The reset of the HGW can be triggered by software/hardware abnormity within the HGW or external requirement such as routing software updated by the administrator. Prior to the reset, the HGW determines if there is a user currently being serviced based on its internal software detection mechanism. If so, the HGW constructs a relocation request message in which the Relocation Cause is set as HGW Reset and the Transaction ID corresponding to the message is recorded. Then the HGW transmits the relocation request message to a HNB to which the user belongs and waits for a response message from the HNB.

After receiving the relocation request message from the HGW, the HNB records the Transaction ID of the message and determines whether the Relocation Cause for the user is HGW Reset. If so, the HNB determines whether the service for the user exists in the HNB according to the user's IMSI. If the service does not exist, the HNB rejects the relocation request and transmits to the HGW a relocation response message in which the Fail Cause is set as Service not existing. If the service does exist in the HNB, the HNB further determines if there is a macro NodeB to which the user can be relocated. If there is such a macro NodeB, the HNB initiates a typical relocation process to relocate the user from the HNB to the macro NodeB. Information on the cell of the macro NodeB which is also covered by the HNB can be informed to the HNB by an entity for the operation, maintenance and administration of the network during initial registration of the HNB. If there is no such a macro NodeB, the HNB rejects the relocation request and transmits a relocation response message in which the Fail Cause is set as No Marco to indicate that there is no macro NodeB for relocating to. For other causes for the failure of the relocation, the Fail Cause in the response message can be set as HNB Internal Error.

Figure 5:
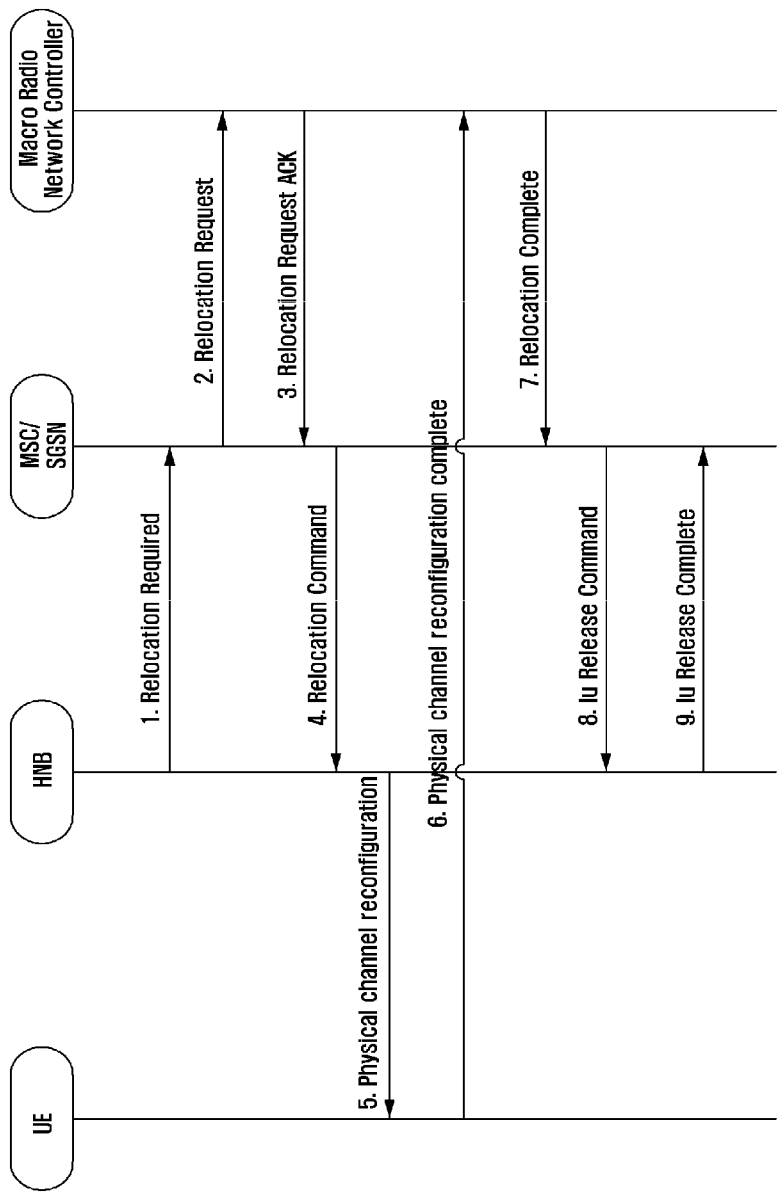
FIG. 5 illustrates a typical relocation procedure.

With reference to FIG. 5, a typical relocation process can be described in detail, which comprises following steps.

1> The HNB transmits a Relocation Required message to SGSN/MSC.

2> The SGSN/MSC transmits a relocation request message to the macro radio network controller requiring the latter to prepare for the relocation.

3> The macro radio network controller initiates a setup procedure for a user plane bearer in the lu interface.

4> The macro radio network controller transmits a relocation request acknowledge message to the SGSN/MSC indicating that the resources for the relocation have been prepared. The message includes reconfiguration information notifying the HNB to use specifically which of the following processes to facilitate the relocation: radio bearer setup, radio bearer release, radio bearer reconfiguration, transmission channel reconfiguration, and physical channel reconfiguration.

5> The SGSN/MSC transmits an relocation command message to the HNB informing the HNB to perform relocation.

6> The HNB transmits a physical channel reconfiguration message (or a message such as radio bearer setup, radio bearer release, radio bearer reconfiguration, and transmission channel reconfiguration, depending on the designation in the previous response message from the macro radio network controller) to UE informing the UE of new physical channel parameters.

7> After successfully accessing the target macro radio network controller, the UE transmits a physical channel reconfiguration complete message to the target macro radio network controller indicating that the handover is completed.

8> The target macro radio network controller transmits a relocation complete message to the SGSN/MSC indicating that the relocation is completed.

9> The SGSN/MSC transmits an Iu release command message to the original HNB requiring the HNB to release the Iu connection.

10> The HNB initiates a release procedure for user plane bearer in the Iu interface.

11> The HNB transmits a Iu release complete message to the SGSN/MSC indicating the release of Iu.

The Second Embodiment

A user relocation procedure triggered by degradation of uplink service quality in Iu-h interface is described in detail below.

In a HNB system, the protocols used between the HNB and a core network are RTP protocol for circuit switch domain user plane bearer and GTP protocol for the packet switch domain user plane bearer, respectively. In a HNB system, IP protocol is utilized as a lower layer transmission protocol for RTP and GTP. It is required by 3GPP specifications that a RTP or GTP datagram is transmitted at the transmitter side with the serial number field in the datagram header incremented during transmission. At the receive side, the link quality can be detected by monitoring the serial number field of the RTP/GTP datagram header such that disordered datagram can be dropped.

In a HNB system, for the downlink, the HNB can detects the link service quality by monitoring the serial number field of the RTP/GTP datagram header such that a Relocation Required message can be constructed to request the core network to initiate relocation process if there is a severe degradation of link service quality. For the uplink, however, it is problematic that the core network cannot autonomously initiate a relocation process even if a severe degradation of link service quality is detected, since the relocation process can only be initiated by the source RNC. In a HNB system, the source RNC is the HNB which, however, does not know the fact that the uplink service quality is severely degraded.

Figure 3:
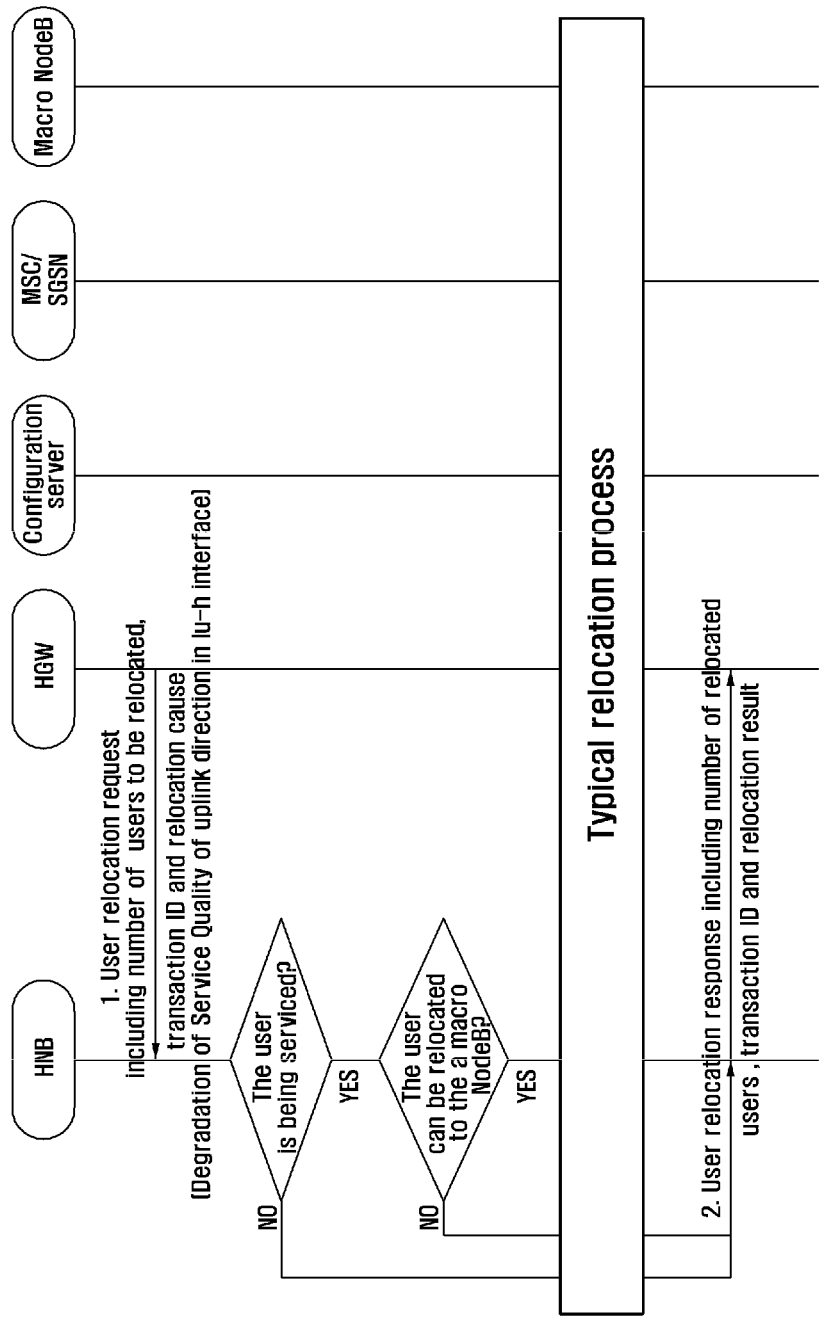
FIG. 3 illustrates a user relocation triggered by degradation of service quality in an lu-h interface.

With reference to FIG. 3, when detecting that uplink service quality in the Iu-h interface is degraded for one or more UEs, the HGW constructs a relocation request message in which a corresponding relocation cause is filled and Transaction ID corresponding to the message is recorded. Then the HGW transmits the relocation request message to a HNB to which the user belongs and waits for a response message from the HNB.

After receiving the relocation request message from the HGW, the HNB records the Transaction ID of the message and determines whether the Relocation Cause for the user is Degradation of Service Quality of uplink direction in Iu-h interface. If so, the HNB determines whether the service for the user exists in the HNB according to the user's IMSI. If the service does not exist, the HNB rejects the relocation request and transmits to the HGW a relocation response message in which the Fail Cause is set as Service not existing. If the service does exist in the HNB, the HNB further determines if there is a macro NodeB to which the user can be relocated. If there is such a macro NodeB, the HNB initiates a typical relocation process to relocate the user from the HNB to the macro NodeB. Information on the cell of the macro NodeB which is also covered by the HNB can be informed to the HNB by an entity for the operation, maintenance and administration of the network during initial registration of the HNB. If there is no such a macro NodeB, the HNB rejects the relocation request and transmits a relocation response message in which the Fail Cause is set as No Marco to indicate that there is no macro NodeB for relocating to. For other causes for the failure of the relocation, the Fail Cause in the response message can be set as HNB Internal Error.

The Third Embodiment

A user relocation procedure triggered by ACL update is described in detail below.

An administrator or authorized user can initiate a maintenance process for ACL including adding or removing a user from the ACL. When a friend drops in, for example, the host as an authorized user may add the friend to the ACL temporarily and remove him from the ACL after the he leaves. With respect to the friend, if he is removed from the ACL by the administrator or authorized user while being serviced by the HNB of the host, his service should not be terminated if there is a macro NodeB in proximity which can provide the service. In this case, it is reasonable to relocate the user to the macro NodeB.

Figure 4:
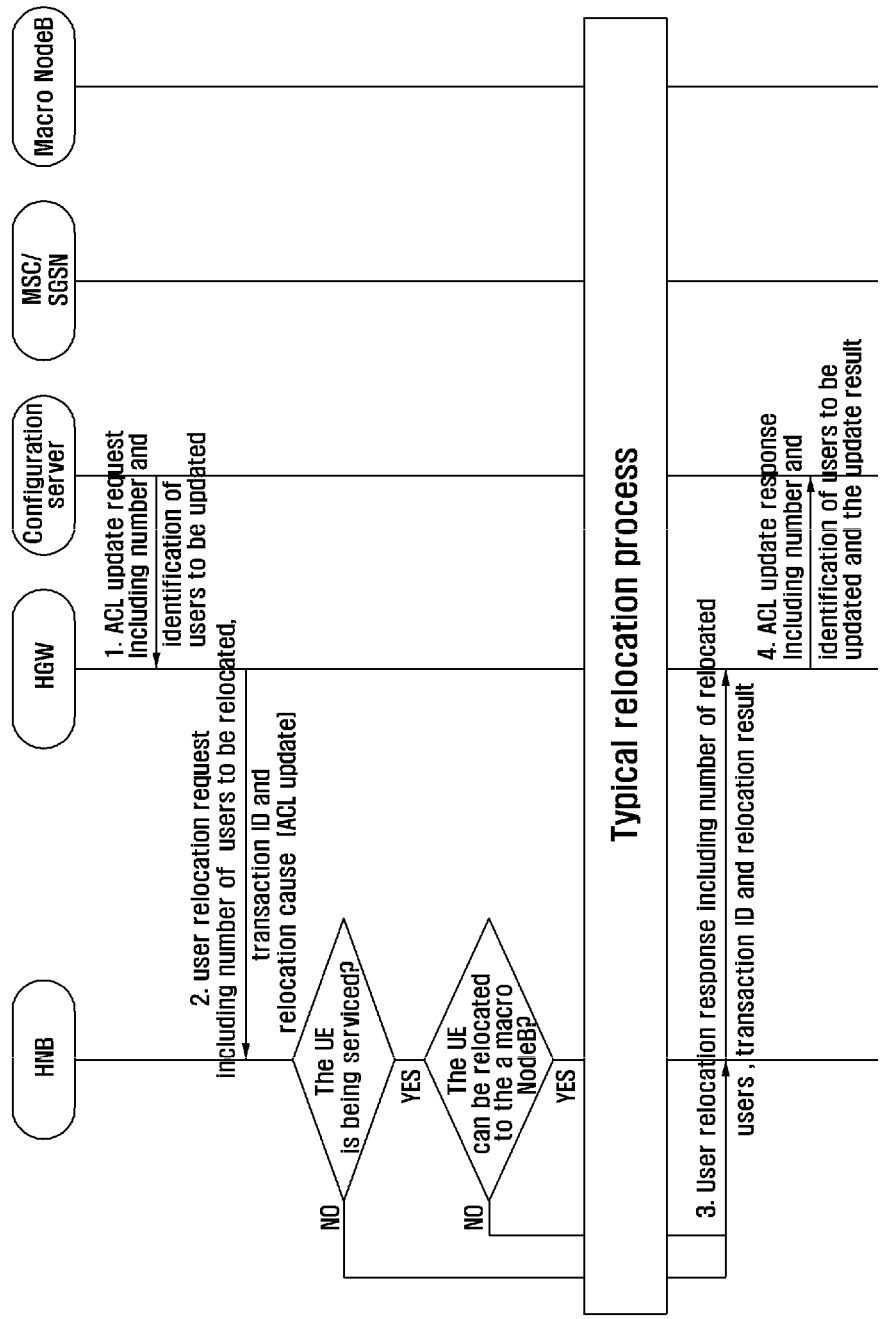
FIG. 4 illustrates a user relocation triggered by ACL update.

With reference to FIG. 4, the administrator or authorized user logs into a HNB Configuration Server (HCS) using web or any other approaches to issue an instruction to remove a user from the ACL. In this case, the HCS transmits an ACL update request message to the HGW instructing the HGW to remove the UE from the ACL. At this point, the HGW determines whether the user is currently being serviced according to the user ID (or IMSI) in the message. If not, the ACL can be directly updated. If the service exists, the HGW initiates a relocation process for the user. The HGW constructs a relocation request message in which the Relocation Cause is set as Removed from ACL and the Transaction ID corresponding to the message is recorded. Then the HGW transmits the relocation request message to a HNB to which the user belongs and waits for a response message from the HNB.

After receiving the relocation request message from the HGW, the HNB records the Transaction ID of the message and determines whether the Relocation Cause for the user is removed from ACL. If so, the HNB determines whether the service for the user exists in the HNB according to the user's IMSI. If the service does not exist, the HNB rejects the relocation request and transmits to the HGW a relocation response message in which the Fail Cause is set as Service not existing. If the service does exist in the HNB, the HNB further determines if there is a macro NodeB to which the user can be relocated. If there is such a macro NodeB, the HNB initiates a typical relocation process to relocate the user from the HNB to the macro NodeB. Information on the cell of the macro NodeB which is also covered by the HNB can be informed to the HNB by an entity for the operation, maintenance and administration of the network during initial registration of the HNB. If there is no such a macro NodeB, the HNB rejects the relocation request and transmits a relocation response message in which the Fail Cause is set as No Marco to indicate that there is no macro NodeB for relocating to. For other causes for the failure of the relocation, the Fail Cause in the response message can be set as HNB Internal Error.

With the above-described embodiments of the present invention, it is possible in a HNB system to implement a UE relocation triggered by a HGW for new scenarios. This scheme enhances the Iu-h interface and facilitates the improvement of service quality of users. Additionally, it is capable of providing users with continuous services in different scenarios. The present method is easy to implement and effective in improving the stability and performance of HNB system.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for relocation in a Radio Network (RN), the method comprising steps of:
receiving, by a first node, from a second node, a Relocation Request message including first information related to an identity of a User Equipment (UE) and second information related to a relocation cause based on a relocation trigger received by the second node;
transmitting, from the first node, to the second node, a Relocation Response message in response to the Relocation Request message;
receiving, by the first node, from the UE, a Physical Channel Reconfiguration complete message;
and transmitting, from the first node, to the second node, a Relocation complete message, wherein the first node includes a Home NodeB (HNB) and second node includes a HNB GateWay (GW), and wherein the second information includes a value indicating one of i) a reset of the HNB GW, ii) a degradation of a service quality in an Iu-home interface, or iii) an update of an access control list (ACL).

2. The method of claim 1, wherein the Relocation Response message indicates success of a relocation or failure of the relocation.

3. The method of claim 2, wherein the success or failure is indicated by a specific field within the Relocation Response message.

4. The method of claim 1, wherein each of the Relocation Request message and the Relocation Response message further includes a cause value indicating a reason for a particular event.

5. The method of claim 4, wherein the particular event includes at least one of a Relocation Request and a Relocation Response.

6. The method of claim 4, further comprising steps of:
transmitting, from a third node, to the second node, a Relocation Required message;
receiving, by the third node, from the second node, a Relocation Command message;
transmitting, from the third node, to the UE, a Physical Channel Reconfiguration;
receiving, by the third node, from the second node, an Iu Release command message; and
transmitting, from the third node, to the second node, an Iu Release complete message.

7. The method of claim 6, wherein the third node includes an HNB.

8. The method of claim 1, wherein the information related to the identity of the UE includes an International Mobile Subscriber Identity (IMSI).

9. A radio Network (RN) including a first node and a second node, the first node comprising;
a transceiver;
and a controller configured for:
receiving, from the second node, via the transceiver, a Relocation Request message including first information related to an identity of a User Equipment (UE) and second information related to a relocation cause based on a relocation trigger received by the second node;
transmitting, to the second node, via the transceiver, a Relocation Response message in response to the Relocation Request message;
receiving, from the UE, via the transceiver, a Physical Channel Reconfiguration complete message;
and transmitting, to the second node, via the transceiver, a Relocation complete message;
wherein the first node includes a Home NodeB (HNB) and the second node includes a HNB GateWay (GW), and wherein the second information includes a value indicating on of i) a reset of the HNB GW, ii) a degradation of a service quality in an Iu-home interface, or iii) an update of an access control list.

10. The RN of claim 9, wherein the Relocation Response message indicates success of a relocation or failure of the relocation.

11. The RN of claim 10, wherein the success or failure is indicated by a specific field within the Relocation Response message.

12. The RN of claim 9, wherein each of the Relocation Request message and the Relocation Response message includes a cause value indicating a reason for a particular event.

13. The RN of claim 9, wherein the particular event includes at least one of a Relocation Request and a Relocation Response.

14. The RN of claim 9, further comprising a third node that transmits a Relocation Required message to the second node, receives a Relocation Command message from the second node, transmits a Physical Channel Reconfiguration to the UE, receives an Iu Release command message from the second node, and transmits an Iu Release complete message to the second node.

15. The RN of claim 9, wherein the third node comprises an HNB.

16. The RN of claim 9, wherein the information related to the identity of the UE includes an International Mobile Subscriber Identity (IMSI).

* * * * *